(12) United States Patent
McEnroe et al.

(10) Patent No.: US 10,743,049 B2
(45) Date of Patent: Aug. 11, 2020

(54) PRE-POSITIONING OF STREAMING CONTENT ONTO COMMUNICATION DEVICES FOR FUTURE CONTENT RECOMMENDATIONS

(71) Applicant: AT&T Intellectual Property I, L.P., Atlanta, GA (US)

(72) Inventors: Martin Patrick McEnroe, Plano, TX (US); Mark D. Austin, Allen, TX (US); Tzvi Chumash, Matawan, NJ (US); Yuan Ding, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 12 days.

(21) Appl. No.: 16/168,983

(22) Filed: Oct. 24, 2018

(65) Prior Publication Data
US 2020/0137443 A1 Apr. 30, 2020

(51) Int. Cl.
| | |
|---|---|
| *H04N 21/262* | (2011.01) |
| *H04N 21/258* | (2011.01) |
| *H04W 4/20* | (2018.01) |
| *H04N 21/414* | (2011.01) |
| *H04N 21/4335* | (2011.01) |

(52) U.S. Cl.
CPC . *H04N 21/26208* (2013.01); *H04N 21/25808* (2013.01); *H04N 21/25891* (2013.01); *H04N 21/41407* (2013.01); *H04N 21/4335* (2013.01); *H04W 4/20* (2013.01)

(58) Field of Classification Search
None
See application file for complete search history.

(56) References Cited

U.S. PATENT DOCUMENTS

| | | | |
|---|---|---|---|
| 8,613,011 B2 | 12/2013 | Hicks, III et al. | |
| 8,949,452 B2 | 2/2015 | Harrang et al. | |
| 9,210,217 B2 | 12/2015 | Raleigh et al. | |
| 9,378,508 B2 | 6/2016 | Burnette et al. | |
| 9,559,969 B2 | 1/2017 | Jaska et al. | |
| 9,762,635 B2 | 9/2017 | Sebastian et al. | |
| 9,769,207 B2 | 9/2017 | Raleigh et al. | |
| 9,794,361 B2 | 10/2017 | Casey et al. | |
| 9,872,055 B1 | 1/2018 | Mathews et al. | |
| 9,930,399 B2 | 3/2018 | Howard | |
| 2012/0095833 A1* | 4/2012 | Bleyl | G06Q 30/02 705/14.53 |

(Continued)

*Primary Examiner* — Justin E Shepard
(74) *Attorney, Agent, or Firm* — Amin, Turocy & Watson, LLP

(57) ABSTRACT

Facilitating pre-positioning of streaming content onto communication devices is provided herein. A system can comprise a processor and a memory that stores executable instructions that, when executed by the processor, facilitate performance of operations. The operations can comprise facilitating an identification of a first multimedia content stream and a second multimedia content stream. The identification can be based on a usage preference of a defined entity associated with a communication device. The operations can also comprise, in response to a determination that an available network satisfies a defined network criterion, facilitating pre-positioning, at a data store of the communication device, the first multimedia content stream and the second multimedia content stream.

20 Claims, 10 Drawing Sheets

(56) References Cited

U.S. PATENT DOCUMENTS

| | | | |
|---|---|---|---|
| 2012/0117632 A1* | 5/2012 | Curtis | G11B 20/10527 |
| | | | 726/7 |
| 2012/0143994 A1* | 6/2012 | Calcev | H04L 43/0882 |
| | | | 709/219 |
| 2014/0115037 A1* | 4/2014 | Liu | H04L 65/1016 |
| | | | 709/203 |
| 2014/0241299 A1* | 8/2014 | Zhao | H04L 47/765 |
| | | | 370/329 |
| 2014/0280764 A1 | 9/2014 | Dasher et al. | |
| 2017/0111465 A1* | 4/2017 | Yellin | H04L 65/605 |
| 2017/0149855 A1 | 5/2017 | Doshi et al. | |
| 2017/0331914 A1 | 11/2017 | Loach | |

\* cited by examiner

PRE-POSITIONING OF STREAMING CONTENT ONTO COMMUNICATION DEVICES FOR FUTURE CONTENT RECOMMENDATIONS

TECHNICAL FIELD

This disclosure relates generally to the field of mobile communication and, more specifically, to, pre-positioning multimedia content streams on communication devices.

BACKGROUND

As communication networks evolve, various communication devices are used to view streaming content (e.g., a movie, a video, or other content) and recommendations related to additional streaming content can be provided. However, the downloading of the streaming content onto the communication devices can be discouraged due to the costs associated with the downloading, as well as the bandwidth utilized for the downloading of content onto the communication devices. Further, downloading of streaming content might not be available, such as when there is no network connectivity (e.g., over-water airplane flight, cruise ship, rural areas, on vacation in a remote area, and/or other times). Such unavailability of downloading of streaming content can occur when the consumer is more highly disposed to want to consume content and not have it available. Accordingly, many of these recommendations and/or downloading of streaming content are disabled and, therefore, the user does not benefit from the recommendations and/or a quick accessibility of the streaming content.

BRIEF DESCRIPTION OF THE DRAWINGS

Various non-limiting embodiments are further described with reference to the accompanying drawings in which.

DETAILED DESCRIPTION

Figure 1:
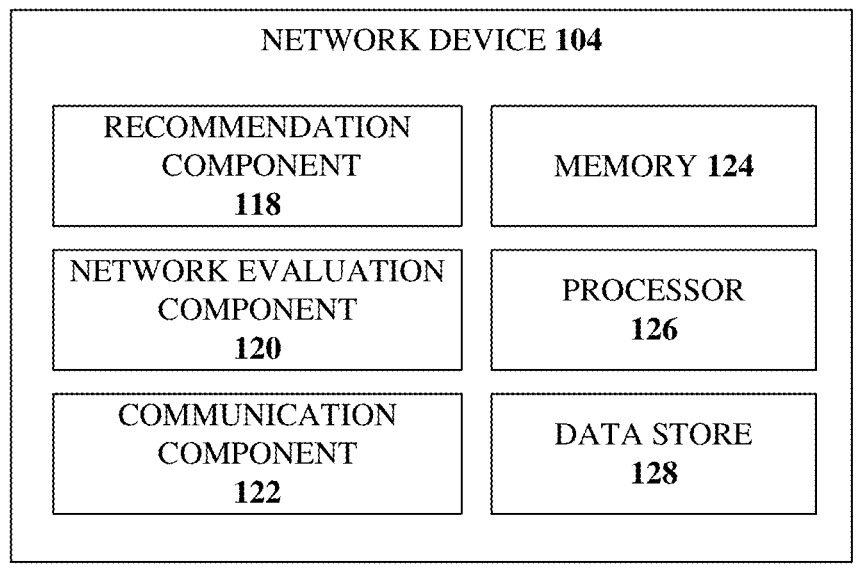
FIG. 1 illustrates an example, non-limiting communications system for pre-positioning streaming content onto communication devices through one or more defined networks in accordance with one or more embodiments described herein.
Figure 1:
Figure 1:
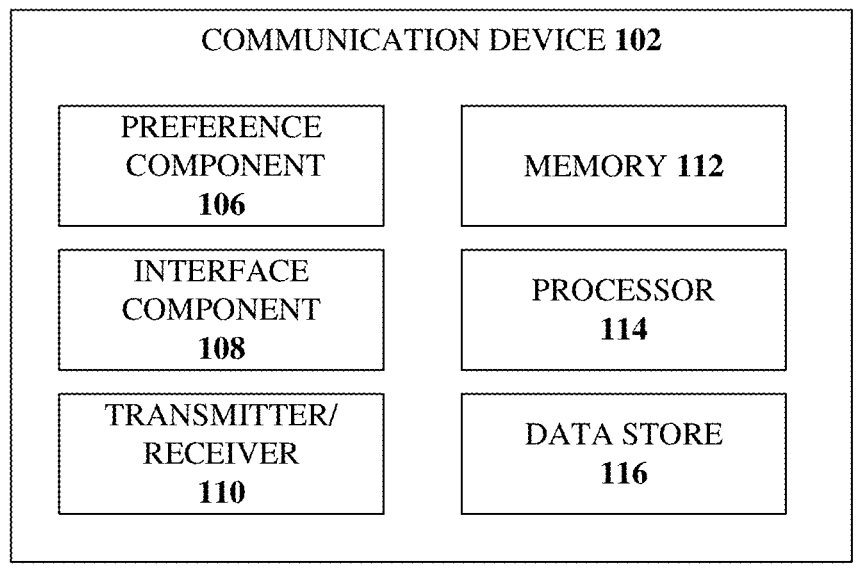

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate pre-positioning streaming content onto communication devices through one or more defined networks. The pre-positioned streaming content can be recommended content and/or content that has the potential to be recommended (e.g., yet-to-be recommended) content. For example, recommended content can be based on a determination that some content would be selected by the consumer if presented correctly (e.g., right time, right place, right sequence) and provides some information to the consumer about the content (e.g., cover art, name, trailer, synopsis). The yet-to-be recommended content can be based on a determination that specific (e.g., popular, unique) content should be ready at hand in case a specific consumer takes a course of action where the content can now be recommended. However, the recommendation act has not yet been triggered (e.g., the device is off, the consumer is not available to consume the content, and so on).

In one embodiment, described herein is a system that can comprise a processor and a memory that stores executable instructions that, when executed by the processor, facilitate performance of operations. The operations can comprise facilitating an identification of a first multimedia content stream and a second multimedia content stream. The identification can be based on a usage preference of a defined entity associated with a communication device. The operations can also comprise, in response to a determination that an available network satisfies a defined network criterion, facilitating pre-positioning, at a data store of the communication device, the first multimedia content stream and the second multimedia content stream.

In an example, the defined network criterion can be a network type. Further to this example, the operations can comprise, prior to allowing the facilitating the pre-positioning, receiving a selection of the network type as the defined network criterion. The operations can also comprise prohibiting the pre-positioning of the first multimedia content stream and the second multimedia content stream in response to the communication device being determined to be in communication with a communications network that is not the network type identified as the defined network criterion. According to a non-limiting example, the network type can be a type assigned to a Wi-Fi network.

According to some implementations, the determination can be a first determination. Further to these implementations, the operations can comprise, in response to a second determination that a power supply capacity of the communication device is below a defined power supply capacity, prohibiting the pre-positioning of the first multimedia content stream and the second multimedia content stream on the communication device.

In accordance with some implementations, the determination can be a first determination. Further to these implementations, the operations can comprise, in response to a second determination that a storage capacity of the data store is below a defined storage capacity, prohibiting the pre-positioning of the first multimedia content stream and the second multimedia content stream on the communication device.

According to an example, the usage preference can comprise a viewing length associated with previously viewed multimedia content streams. Further to this example, facilitating the pre-positioning can comprise facilitating the pre-positioning, at the communication device, of a first portion of the first multimedia content stream and a second portion of the second multimedia content stream. The first portion and the second portion can comprise respective viewing lengths that comprise respective time intervals that are longer than the viewing length associated with the previously viewed multimedia content streams by a defined length.

The operations can comprise, according to some examples, removing the first multimedia content stream from the data store based on an indication received from the communication device that the first multimedia content stream is not of interest to the defined entity. Removal of the first multimedia content stream from the data store can discontinue recommendations of multimedia content streams associated with the usage preference utilized to recommend the first multimedia content stream.

In some implementations, the usage preference can be a first usage preference, and the determination that the available network satisfies the defined network criterion can be a first determination. Further to these implementations, the operations can comprise, in response to a second determination that the first multimedia content stream and the second multimedia content stream were not consumed during a defined time interval, removing the first multimedia content stream and the second multimedia content stream from the data store. In addition, the operations can comprise, in response to a third determination that a third multimedia content stream satisfies a second usage preference and the available network continues to satisfy the defined network criterion, facilitating pre-positioning, at the data store of the communication device, the third multimedia content stream.

Another embodiment relates to a method that can comprise facilitating, by a network device of a wireless network and comprising a processor, an identification of a first multimedia content stream that satisfies a first usage parameter and a second multimedia content stream that satisfies a second usage parameter. The first usage parameter and the second usage parameter can be usage parameters determined to be associated with an identified entity of a communication device. The method can also comprise, in response to a determination that an available network satisfies a defined network criterion and a parameter of the communication device satisfies a defined parameter, facilitating, by the network device, a preloading of the first multimedia content stream and the second multimedia content stream at a data store of the communication device.

According to some implementations, the defined parameter can comprise a remaining battery power level of the communication device. Further to these implementations, the method can comprise prohibiting, by the network device, the preloading of the first multimedia content stream and the second multimedia content stream based on the remaining battery power level being determined to be below the defined parameter.

In some implementations, the defined parameter can comprise a remaining storage level of the data store. Further to these implementations, the method can comprise prohibiting, by the network device, the preloading of the first multimedia content stream and the second multimedia content stream based on the remaining storage level of the data store being determined to be below the defined parameter. In an example, the defined network criterion can comprise an identified network that does not specify a bandwidth usage limitation.

The method can comprise, according to some implementations and prior to facilitating pre-positioning, receiving, by the network device, a notification of a network type as the defined network criterion. The method can also comprise prohibiting, by the network device, the preloading of the first multimedia content stream and the second multimedia content stream when the communication device is being serviced by a communications network that is not the network type identified as the defined network criterion.

In accordance with some implementations, the first usage parameter can comprise a first viewing length and the second usage parameter can comprise a second viewing length associated with previously viewed multimedia content streams. Further to these implementations, facilitating the preloading can comprise facilitating the preloading, at the communication device, a first portion of the first multimedia content stream and a second portion of the second multimedia content stream. The first portion can comprise the first viewing length and the second portion can comprise the second viewing length. Further, the first viewing length and the second viewing length can comprise respective time intervals that are longer, by a defined interval, than a third viewing length associated with the previously viewed multimedia content streams.

According to some implementations, the determination is a first determination, and the preloading is a first preloading. Further to these implementations, the method can comprise receiving, by the network device, an acceptance of the first multimedia content stream based on a consumption of the first multimedia content stream at the communication device. The method can also comprise, in response to a second determination that the available network satisfies the defined network criterion and the parameter of the communication device satisfies the defined parameter, facilitating, by the network device, a second preloading of a third multimedia content stream at the data store of the communication device.

In some implementations, the determination can be a first determination, the available network can be a first available network, and the preloading can be a first preloading. Further to these implementations the method can comprise facilitating, by the network device, removal of the first multimedia content stream and the second multimedia content stream from the data store after a defined time interval. The method can also comprise, in response to a second determination that a second available network satisfies the defined network criterion and the parameter of the communication device satisfies the defined parameter, facilitating, by the network device, a second preloading of a third multimedia content stream at the data store of the communication device. The third multimedia content stream can satisfy a third usage parameter determined to be associated with the identified entity of the communication device. The third usage parameter can be different than the first usage parameter and the second usage parameter.

Another embodiment relates to a machine-readable storage medium, comprising executable instructions that, when executed by a processor, facilitate performance of operations. The operations can comprise evaluating usage preferences of a defined entity of a communication device. The usage preferences can comprise historical viewing habits of the defined entity. The operations can also comprise based on a first determination that a first multimedia content stream conforms to the usage preferences of the defined entity, a second determination that a network parameter satisfies a defined network parameter, and a third determination that a device capability satisfies a defined device capability, facilitating a first preloading of the first multimedia content stream to a data store of the communication device. Further, the operations can comprise based on an indication received from the communication device that the first multimedia content stream has been consumed at the communication device, and a fourth determination that the network parameter continues to satisfy the defined network parameter, facilitating a second preloading of a second multimedia content stream to the data store of the communication device. The second multimedia content stream can be related to the first multimedia content stream.

According to some implementations, the defined device capability can be an available storage capacity of the data store being above a defined storage capacity. In some implementations, the defined device capability can be an available battery power capacity of the data store being above a defined battery power capacity.

The operations can comprise, according to some implementations, facilitating measurements of respective viewing lengths associated with previously viewed multimedia content streams. Further, the operations can comprise facilitating pre-positioning, at the communication device, a first portion of the first multimedia content stream and a second portion of the second multimedia content stream. The first portion can comprise a first viewing length and the second portion can comprise a second viewing length. Further, the first viewing length and the second viewing length can comprise respective time intervals that are longer than the respective viewing lengths associated with previously viewed multimedia content streams by a defined interval.

Referring initially to FIG. 1, illustrated is an example, non-limiting, communications system 100 for pre-positioning of streaming content onto communication devices through one or more defined networks in accordance with one or more embodiments described herein. The various aspects discussed herein can provide a user (e.g., a viewing entity, a viewer, an identified entity) a mechanism to specify one or more defined networks for automatically downloading or pre-positioning content onto a communications device. The defined networks can be networks for which an amount of usage is not of concern to the user, for example. While a communication device (associated with the user) is connected to the one or more defined networks, streaming content can be pre-positioned or preloaded onto the communication device.

Streaming content (or streaming media) can be in picture, audio, and/or video format and can span any type of format or set of capabilities that the device can retrieve from memory. This includes but is not limited to mono, stereo, quad, low bit rate video, high definition, 4 k, 8 k, stereovision, and/or augmented reality. Content can also include instructions to recreate content such as an algorithm or game simulator or a screen saver that is generated from a set of still images. Other playback sensors can be activated by the recorded or generated content. For example, the device could physically shake in the hands of the user during a movie about earthquakes if the instructions are preloaded along with the video or calculated during playback by an algorithm set to recognize parts of the audio or video during playback. Content can be classified by its commercial utility regardless of other characteristics. For example, content can be a movie, a television show, a sports event, a concert, a music video, a speed run of a game, a commercial (advertisement) for content or for a non-content product (e.g. shampoo), a documentary, a trailer for another piece of content, an audiobook.

In alternative, or additional, implementations, the user can define an amount of remaining battery capacity (e.g., a battery life) associated with the communication device. If the remaining battery capacity is below the defined amount, the streaming content is not pre-positioned on the device. According to alternative, or additional, implementations, the user can define an amount of storage capacity of the communications device. The defined amount of storage capacity can specify how much capacity can be utilized to store pre-positioned content on the communication device.

According to some implementations, the pre-positioned content can be the preferred content for recommendations of content for viewing at the communication device (by the user). For example, the pre-positioned content can be preferred over other content that has not been pre-positioned and, thus, will need to be newly loaded on the communication device.

For example, viewers desire quick access to streaming content (e.g., videos). When a viewer is binge watching a first episode of a show, the viewer might want to move quickly to the next episode of the show. This can frequently occur in high network traffic environments (e.g., an LTE environment) and/or during periods of high traffic use or while a large amount of bandwidth is being consumed in the network. The aggregate video download can be of such high demand, that it can be sufficient to drive new capital spend on the LTE network, which can be an expensive and lengthy process. Therefore, the various aspects discussed herein can pre-position content on a communications device while the device is in a low network traffic environment, during periods of low usage, and/or based on other considerations.

The communications system 100 can include a communication device 102 and a network device 104. The network device 104 can be included in a group of network devices of a wireless network. Although only a single communication device and a single network device are shown and described, the various aspects are not limited to this implementation. Instead, multiple communication devices and/or multiple network devices can be included in a communications system.

The communication device 102 can include a preference component 106, an interface component 108, a transmitter/receiver 110, at least one memory 112, at least one processor 114, and at least one data store 116. The network device 104 can include a recommendation component 118, a network evaluation component 120, a communications component 122, at least one memory 124, at least one processor 126, and at least one data store 128.

The preference component 106 can be configured to receive and/or infer one or more preferences of a user (e.g., a viewing entity) of the communication device 102. For example, the user can interface with the communication device 102, via the interface component 108, to input one or more selections related to preferences. For example, the user can provide a selection of one or more network types, a remaining battery capacity, and/or a storage amount that should be utilized to pre-position content on the communication device 102.

In another example, the preference component 106 can be configured to evaluate one or more historical interactions of the user and ascertain one or more usage preferences (e.g., consumption preferences) of the user. For example, a consumption preference can be a duration (of time) during which the user consumes the multimedia content. The duration can be an average amount of time spent consuming a first content before switching to a second content. In some implementations, the duration can be categorized by type of content being output, a time and/or a place where the content is being consumed, and so on. In another example, the consumption preference can relate to a category of multimedia content the viewer prefers (e.g., for movies: romance, comedy, action, and so forth; for music: jazz, country, rock, and so on).

In some implementations, the information related to the interactions can be received from the communication device 102 automatically based on observing user behavior and/or interactions performed at the communication device 102 (e.g., by the user). The historical interactions can be previous interactions of the user that can be monitored by the communication device 102 and/or received by the communication device from another entity and/or system. For example, the monitored interactions can be received directly from the user through the interface component 108. The monitored interactions can be electronic communications, electronic interactions, and/or electronic transactions determined to have been performed by the user at the communication device 102 (or at other communication devices of the user). According to some implementations, the monitored interactions can be a behavior of the user. In some cases, the information can be directly received from the user based on an interaction between the user and the communications system 100 (e.g., through the interface component 108). Accordingly, the interface component 108 can provide the user control over one or more multimedia content streams pre-positioned by the network device 104.

If multiple communication devices are associated with the user, monitored interactions at the multiple communication devices can be considered to be related to the user. As monitored interactions are received at the network device 104, the monitored interactions can be stored in the at least one data store 116 or another device (e.g., the at least one memory 112). The monitored interactions can be stored as historical interactions according to an implementation.

According to some implementations, the monitored or historical interactions can be captured by the communication device 102 and sent to the network device 104 for evaluation (e.g., via the transmitter/receiver 110 and/or the communications component 122). The interactions can be stored as historical interactions in the at least one data store 128 and/or the at least one memory 124.

As discussed, the user can interact with the interface component 108 to provide information related to preferences. In another example, the user can interact with the interface component 108 to select a multimedia content from a group of multimedia content retained in the at least one data store 116 (e.g., pre-positioned content). Further, the multimedia content can be rendered via the interface component 108 in a perceivable format (e.g., visually, audibly, and so on).

According to some implementations, a preference can be associated with allowing the pre-positioning of content while a device is idle (e.g., no other activities are being performed with the device). In some implementations, depending on a location of the communication device 102, pre-positioning of content can be restricted. For example, if the user is in a corporate training class, although the device may be idle, the user does not want to access the corporate network for the pre-position of content (e.g., does not want the device to be performing activities in the background while the user should be working). Accordingly, based on location, time, and other parameters, the pre-positioning of content can be restricted.

The recommendation component 118 can provide one or more recommendations related to one or more multimedia content streams determined to be of (at least potential) interest to the user. These one or more multimedia content streams can be pre-positioned on the communication device 102. By way of example and not limitation, the user might watch a particular show while working out and might consume three episodes during the workout. However, the network available during the workout might not be a defined network. Therefore, prior to the expected time/day of the workout, the communications system 100 can pre-position the next three episodes of the show for consumption during the next workout. Upon or after consumption of the episodes, the episodes can be removed from the at least one data store 116. If it is determined that during the workout the user only viewed two episodes, those two episodes can be removed and the third episode can be retained in the at least one data store 116 for consumption during the next workout. However, if there is limited storage capacity and other data should be pre-positioned on the device (e.g., it is the weekend and the user is expected to play computer games over the weekend), the third episode can also be removed and different content (e.g., the video game, or portions thereof) can be pre-positioned on the communication device 102.

Continuing the above example, if the user only has a few more episodes of the show to view, multimedia content related to other shows the user might like can be pre-positioned on the device. In another example related to the computer games, the communications system 100 can determine the progress of the game and the recommendation component 118 can determine that the next seven levels, for example, of the game should be pre-positioned on the communication device 102, while on a defined network. Accordingly, as the user plays the game, delays and/or interruption of service can be mitigated.

In accordance with some implementations, the determination of the multimedia streams by the recommendation component 118 can be based on other users (e.g., a cross segment of the population where users can be divided into clusters). For example, the user of the communication device 102 has a preference for a first movie. If other users that have enjoyed the first movie also like a second movie, the recommendation component 118 can determine the second movie should be pre-positioned on the communication device 102. Accordingly, interactions outside the content delivery system, and events occurring on the device, or in "real-life" can be utilized to determine which content to pre-position on a device.

In another example, future usage can be inferred based on a location type. For example, the communications system 100 can be more aggressive about pre-positioning if the user is at an airport verses at home, and can be much more aggressive if the user is in the international lounge of the airport. Thus, if it can be determined that the user will be offline for a length of time, the amount of content pre-positioned on the device can be proportional to the amount of time expected to be offline.

According to some implementations, the recommendation component 118 can interact with other applications on the communication device 102 to determine whether to pre-position content, and which content to pre-position. For example, if the user has purchased a rapid transit ticket, and based on information known about the user, it is estimated that the user will be a passenger for forty-five minutes, content can be pre-positioned for consumption during the journey. The triggering of the pre-position of the content, in this example, can be based on the ticket purchase.

Prior to pre-positioning content on the communication device 102, the network evaluation component 120 can determine whether an available network satisfies a defined network criterion. For example, the defined network criterion can be a network type. Therefore, the network evaluation component 120 can receive a selection of the network type (e.g., through interaction with the user, such as through the interface component 108). In an example, the network type can be a type assigned to a Wi-Fi network, however the disclosed aspects are not limited to this network type.

In an example, a network available at the user's home might have a monthly limit on the amount of usage available (or an extra cost for going over a certain limit). Therefore, the user can specify that the home network should not be utilized to pre-position content. Thus, content expected to be consumed by the user while at home can be pre-positioned on the communication device 102 at another location.

Other considerations could also be utilized to determine when to pre-position content. Such considerations can include, but are not limited to, an amount of battery life remaining at the device and/or a storage capacity of the device.

According to some implementations, a resolution of a first set of content pre-positioned on the device can have a higher resolution than a second set of content pre-positioned on the device. For example, if the first set of content is related to a movie that shows beautiful scenery, a high level of resolution should be enabled. Further to this example, the second set of content can be related to the latest princess animated cartoon and, thus, the resolution might not be important.

When an available network is determined to satisfy the defined network criterion, the network evaluation component 120 can allow the pre-positioning of the multimedia content streams. However, if the network evaluation component 120 determines the available network does not satisfy the defined network criterion, pre-positioning of the multimedia content streams can be prohibited.

Through the communications component 122, the network device 104 can facilitate transmission of a recommendation of the pre-positioned content and delivery of the multimedia content stream at the communication device 102. It is noted that the pre-positioned content can be content expected to be consumed by the user. Thus, the communications system 100 can manage content for the user without the user needing to manually select content and downloading the content on demand.

For example, based on a determination that the recommendation output by the recommendation component 118 is accepted, an indication that the multimedia content stream should be rendered for consumption at the communication device 102 can be sent to the communication device 102 or to another device that can provide the multimedia content stream.

According to some implementations, more than one communication device can be associated with the user. For example, the user can utilize two or more communication devices (e.g., a mobile phone, a laptop computer, an Internet of Things (IoT) device, and so on), which can be determined to be associated with the user. Thus, the communications system 100 can be configured to monitor interactions across all associated communication devices and facilitate pre-positioning and output of the multimedia content stream at one or more of the communication devices.

The transmitter/receiver 110 (and/or the communications component 122) can be configured to transmit to, and/or receive data from, the network device 104 (or the communication device 102), other network devices, and/or other communication devices. Through the transmitter/receiver 110 (and/or the communications component 122), the communication device 102 (and/or the network device 104) can concurrently transmit and receive data, can transmit and receive data at different times, or combinations thereof. According to some implementations, the transmitter/receiver 110 (and/or the communications component 122) can facilitate communications between an identified entity associated with the communication device 102 (e.g., an owner of the communication device 102, a user of the communication device 102, and so on). Further, the transmitter/receiver 110 (and/or the communications component 122) can be configured to receive, from the network device 104 or other network devices, multimedia content as discussed herein.

The at least one memory 112 can be operatively connected to the at least one processor 114. Further, the at least one memory 124 can be operatively connected to the at least one processor 126. The memories (e.g., the at least one memory 112, the at least one memory 124) can store executable instructions that, when executed by the processors (e.g., the at least one processor 114, the at least one processor 126) can facilitate performance of operations. Further, the processors can be utilized to execute computer executable components stored in the memories.

For example, the memories can store protocols associated with pre-positioning one or more multimedia content streams on a communication device as discussed herein. Further, the memories can facilitate action to control communication between the communication device 102 and the network device 104 such that the communications system 100 can employ stored protocols and/or algorithms to achieve improved communications in a wireless network as described herein.

The memories can store respective protocols associated with pre-positioning of one or more multimedia content streams for output at a communication device (e.g., the communication device 102), taking action to control communication between the communication device 102 and the network device 104, such that the communications system 100 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to customized recommendations associated with pre-positioning (or preloading) multimedia content streams in a communication network. The processors can be processors dedicated to analyzing and/or generating information received, a processor that controls one or more components of the communications system 100, and/or a processor that both analyzes and generates information received and controls one or more components of the communications system 100.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

Figure 2:
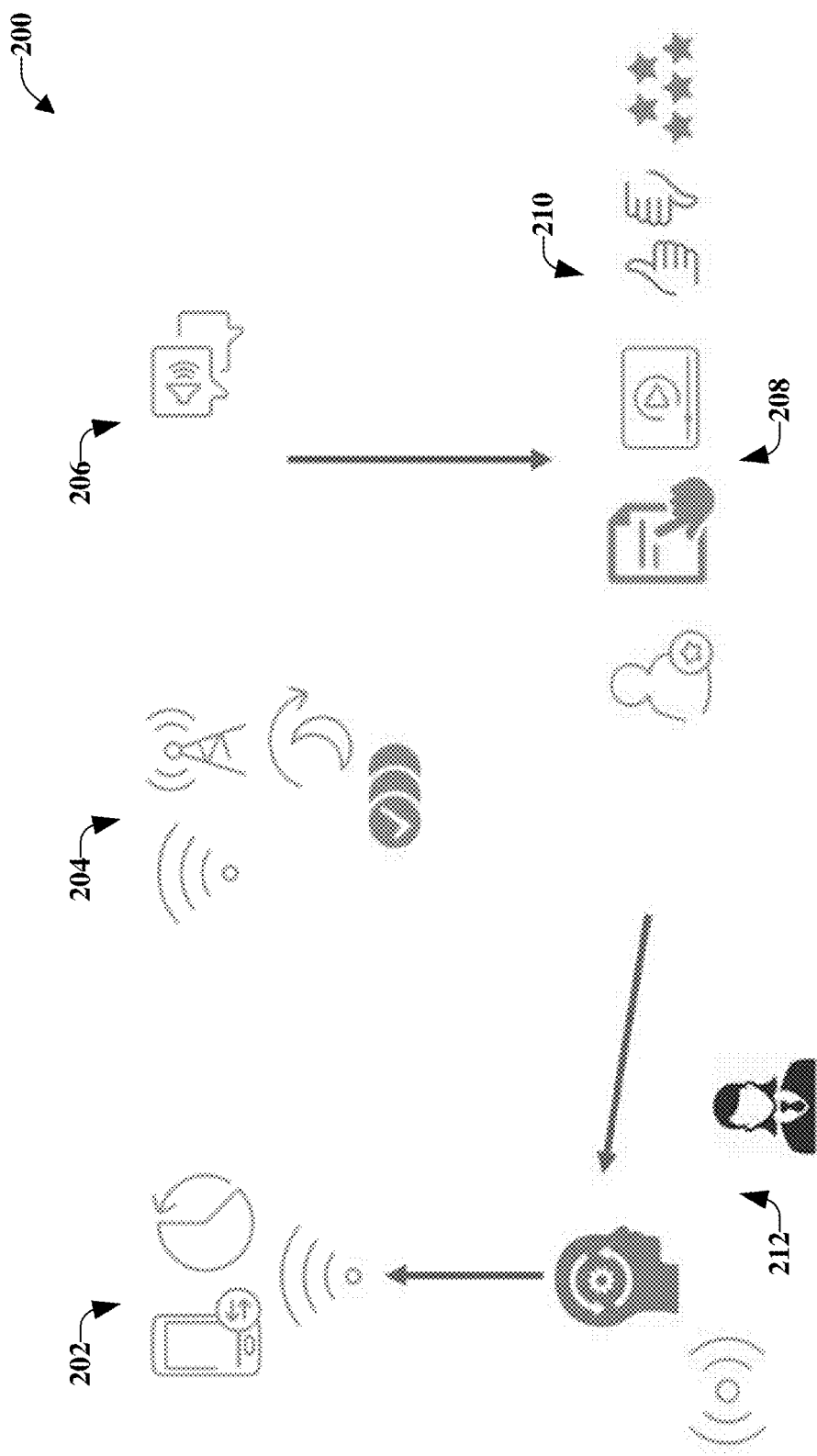
FIG. 2 illustrates an example, non-limiting, schematic representation of a flow diagram of a communications system for pre-positioning multimedia content on a communication device in accordance with one or more embodiments described herein.

FIG. 2 illustrates an example, non-limiting, schematic representation of a flow diagram of a communications system 200 for pre-positioning multimedia content on a communication device in accordance with one or more embodiments described herein. Repetitive description of like elements employed in other embodiments described herein is omitted for sake of brevity. The communications system 200 can comprise one or more of the components and/or functionality of the communications system 100, and vice versa.

At 202, a user can enroll in pre-positioning (e.g., video pre-positioning) by downloading an application on their device (e.g., via the communication device 102). According to some implementations, the application can be pre-installed on the device. According to some implementations, the user can allocate an amount of memory (e.g., the at least one data store 116) on the device to use for storage of pre-positioned content.

Further, the user can identify and manage which networks are allowed to be used for pre-positioning traffic. For example, the user can block their home network if there is a monthly usage limit associated with the account. Further to this example, the user could only allow pre-positioning to be performed on one or more defined networks (e.g., at work, at the coffee shop, at the gym, and so on).

The user could also select out of hours usage (or hours that have low network traffic) on the defined network, if allowed by the network device or a service provider associated with the network device. Further, the network device (e.g., the network device 104 or an associated service provider) could control pre-positioning of a specific user over a network, for example. The pre-positioning over the identified network can be performed dynamically based on load at the moment on the specific cell.

According to some implementations, the video provider can use an algorithm that factors the customer's previous watching usage and characteristics (e.g., likes reality television, watches three episodes at a time) to deploy trailers and shows. At 204, the network device can pre-position content per the video provider algorithm onto the device (e.g., via the communications component 122 and/or the transmitter/receiver 110).

Further, at 206, the pre-positioned content can be promoted over other content that is not pre-positioned and would necessitate a new download (e.g., via the recommendation component 118). For example, an advertisement can be output to the user via the application with a heavier focus on the pre-positioned content.

Further, the network device 104 can actively manage the space allocated to the pre-positioned content, based on the application feedback on the network state, available, allowed pre-positioning networks, and/or customer preferences (e.g., via the device parameters component 302). For example, at 208, the user can select a pre-positioned video for consumption (e.g., can watch the video, can listen to music or other audible content, can play a computer game, and so on).

Feedback 210 can be solicited from the user (e.g., via a modification component 306). The feedback can be utilized to update recommendations and manage content on the device, at 212. In an example, the user can be asked about their experience, which can be fed back (e.g., to the recommendation component 118 or another system component) to determine which content was accurate (e.g., consumed and liked by the user) and which content was inaccurate (e.g., not consumed or not liked by the user). In another example, the feedback can include the fact that the user was provided with x amount of content, and after viewing (at least portions of) the x content, went ahead and downloaded different content, which can indicate none of the x content was successful.

According to some implementations, the communications system 200 can infer the mood of the customer (e.g., the user) by the preceding, coincident, and/or post consumption use of apps (e.g., applications executing on the user device). For example, through the use of a Gaussian Mixture Model (or similar) mechanism, the communications system 200 can infer the current mood of the consumer and estimate the coming mood transitions and use that knowledge to adjust pre-positioning and recommendation. Information gleaned from other apps, such as a step counter, a pulsometer, or a telemeter (if mountaineering) can be used in the pre-positioning and recommendation algorithm.

Figure 3:
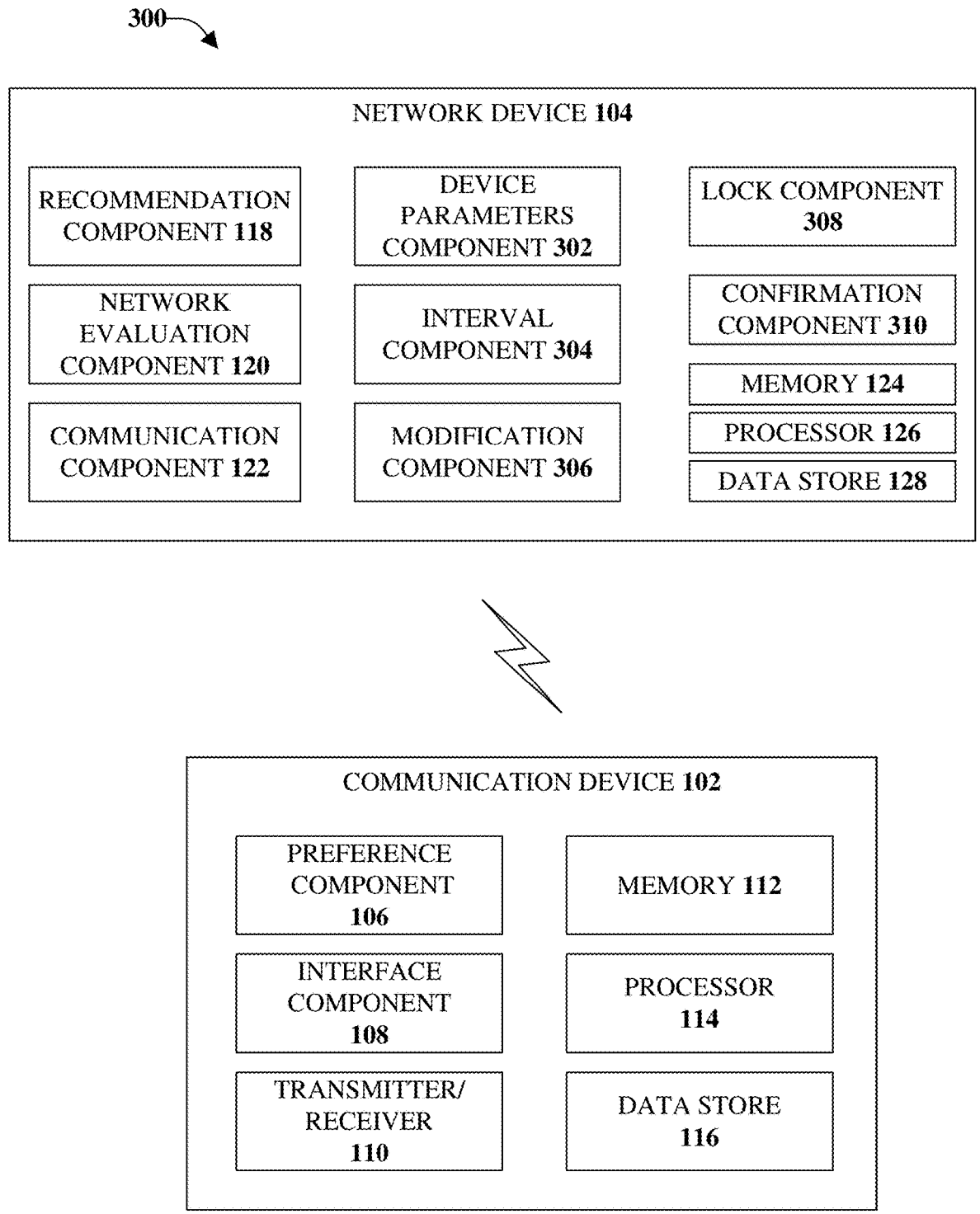
FIG. 3 illustrates an example, non-limiting, communications system for preloading content on a communication device based on defined factors in accordance with one or more embodiments described herein.

FIG. 3 illustrates an example, non-limiting, communications system 300 for preloading content on a communication device based on defined factors in accordance with one or more embodiments described herein. Repetitive description of like elements employed in other embodiments described herein is omitted for sake of brevity. The communications system 300 can comprise one or more of the components and/or functionality of the communications system 100, the communications system 200, and vice versa.

The communications system 300 can comprise a device parameters component 302, an interval component 304, the modification component 306, a lock component 308, and a confirmation component 310. In an example, a device parameter can be a power supply capacity of the communication device. Therefore, if a power supply capacity of the communication device is determined, by the device parameters component 302, to be below a defined power supply capacity, the pre-positioning of the first multimedia content streams on the communication device can be prohibited.

In another example, the device parameter can be a storage capacity of the data store (e.g., the at least one data store 116). Therefore, if the device parameters component 302 determines the capacity of the at least one data store 116 is below a defined storage capacity, the pre-positioning of the multimedia content streams on the communication device can be prohibited.

The interval component 304 can be configured to determine a viewing length associated with previously viewed multimedia content. For example, a user might have a short attention span and (usually) only consumes a small portion of content (e.g., five minutes). Therefore, it can be determined that the complete content does not need to be pre-loaded. However, if the user does eventually select a content and desires to watch it in its entirety, and downloads the content, there is still a gain because there might have been a large amount of sampling by the user before making the commitment.

Thus, based on the determined viewing length, the pre-positioned content can comprise a same viewing length, a similar viewing length, or a different viewing length. For example, a first portion of the first multimedia content stream can comprise a first viewing length and a second portion of the second multimedia content stream can comprise a second viewing length. The first viewing length and the second viewing length can comprise respective time intervals that are longer than the viewing length associated with the previously viewed multimedia content streams by a defined length. In some implementations, the first viewing length and the second viewing length can be a same length, a similar length, or different lengths.

For example, if the determination is that the user historically watches only the first eight minutes of a program, the interval component 304 can determine that a length equal to or more than eight minutes should be utilized for the pre-positioned content. Accordingly, this can conserve storage space in the at least one data store 116.

Upon or after consumption of a pre-loaded multimedia content, the user can provide feedback (e.g., via the interface component 108). Based on this feedback, the modification component 306 can be configured to remove, the first multimedia content stream from the data store based on an indication received from the communication device that the first multimedia content stream is not of interest to the user. In addition, removal of the first multimedia content stream from the data store can discontinue recommendations of multimedia content streams associated with the usage preference utilized to recommend the first multimedia content stream.

In accordance with some implementations, the interval component 304 can be configured to monitor a time interval that can be initiated upon or after media content is pre-positioned on the communication device. For example, the interval component 304 can determine that a first multimedia content stream and a second multimedia content stream were not consumed during a defined time interval. Based on the expiration of the timer associated with the interval component 304, the modification component 306 can remove the first multimedia content stream and the second multimedia content stream from the data store. The removed content can be replaced with other multimedia content.

As discussed herein, according to various implementations, a user can select a list of networks (typically Wi-Fi) for which there is no usage concern. The user can select a storage amount to be used for management of multimedia content and for pre-positioning of the multimedia content, which can be performed in the background (e.g., user is not aware the downloading of multimedia content is being performed). According to some implementations, the multimedia content can be placed on the communication device prior to the user indicating a desire for the content. Further, the system can select material (e.g., multimedia content) that has been pre-positioned to play trailers (previews or recommendations) for video content that has been pre-positioned. The user can select a multimedia content (e.g., a video) to start watching after having seen a trailer or after receiving a recommendation. The recommendations can be tailored both to the user's consumption history and other factors, including that the multimedia content has been pre-positioned on the communication device.

The lock component 308 can be configured to lock and/or unlock content. For example, the lock component 308 can be configured for release date unlocking. Thus, content can be pre-loaded on one or more devices and not available for viewing until the release date. The lock component 308 can dynamically unlock the content on the specified date and/or time. In another example, this can be applied with a simultaneous release of content (e.g., a season finale). The content can be positioned (e.g., pre-positioned) on the devices via low cost bandwidth opportunities and can made available (via the lock component 308) at about the same time, which can be online or offline. Thus, even though a device is offline, since the content is pre-positioned (or pre-loaded) on the device, the content can be available offline, as discussed herein.

The confirmation component 310 can be configured to determine if the content is available for the user. For example, one or more content can be available after purchase of the content. Therefore, even though the content could be pre-positioned on the device, the content is not available (e.g., via the lock component 308) until the confirmation component 310 authorized release of the content. Further, as discussed above, the release data unlocking by the lock component 308 can be utilized with or without a financial payment, and online or offline.

Figure 4:
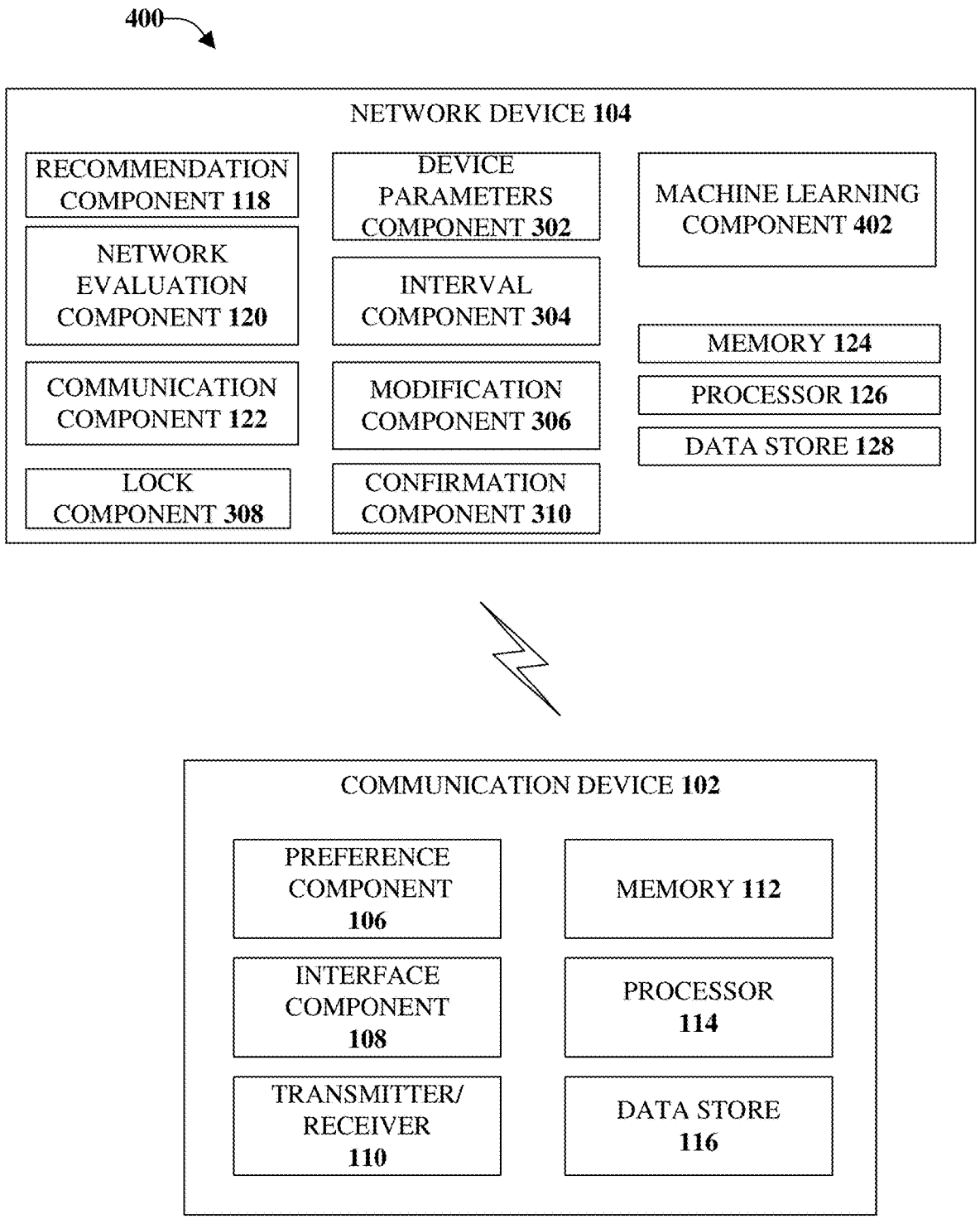
FIG. 4 illustrates an example, non-limiting communications system that employs automated learning to facilitate one or more of the disclosed aspects in accordance with one or more embodiments described herein.

FIG. 4 illustrates an example, non-limiting, communications system 400 that employs automated learning to facilitate one or more of the disclosed aspects in accordance with one or more embodiments described herein. Repetitive description of like elements employed in other embodiments described herein is omitted for sake of brevity. The communications system 300 can comprise one or more of the components and/or functionality of the communications system 100, the communications system 200, the communications system 300, and vice versa.

The communications system 400 can include a machine learning component 402, which can perform a set of machine learning computations associated with the monitored interactions, evaluation of usage preferences based on historical viewing habits, selection of multimedia content to be pre-positioned on the communication device 102, selection of pre-positioned multimedia content to remove from the communication device 102, and so on. For example, the machine learning component 402 can determine an amount of interest the user has in the historically viewed content and/or the pre-positioned multimedia content, the monitored interactions of the user that indicate interest, or disinterest, in one or more multimedia streams, adjustments to the type of multimedia content that is pre-positioned on the communication device 102, an amount of content that is pre-positioned, and so on.

The machine learning component 402 can utilize machine learning systems that have been explicitly or implicitly trained to learn, determine or infer user interests, select multimedia content to pre-position on the communication device 102, respective viewing lengths of the multimedia content that should be pre-positioned on the communication device 102, user input related to one or more recommendations, and modifications to recommendations based on the input and/or other monitored interactions. It is to be appreciated that machine learning systems can be implemented in one or more of the components to generate explicitly and/or implicitly trained models that provide the selection of multimedia content to pre-position, when to pre-position the content, and so on. The machine learning systems can learn systems, networks, etc., identify interests of the user, respective preferences of the user, and so on in order to determine or infer one or more multimedia content streams that should be pre-positioned on the communication device 102 and recommended to the user.

According to some implementations, the interface component 108 (or respective interface components of the one or more computing devices as well as other interface components discussed herein) can provide a graphical user interface (GUI), a command line interface, a speech interface, Natural Language text interface, and the like. For example, a Graphical User Interface (GUI) can be rendered that provides a user with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the user did want the action performed.

The user can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (EGA)) with limited graphic support, and/or low bandwidth communication channels.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
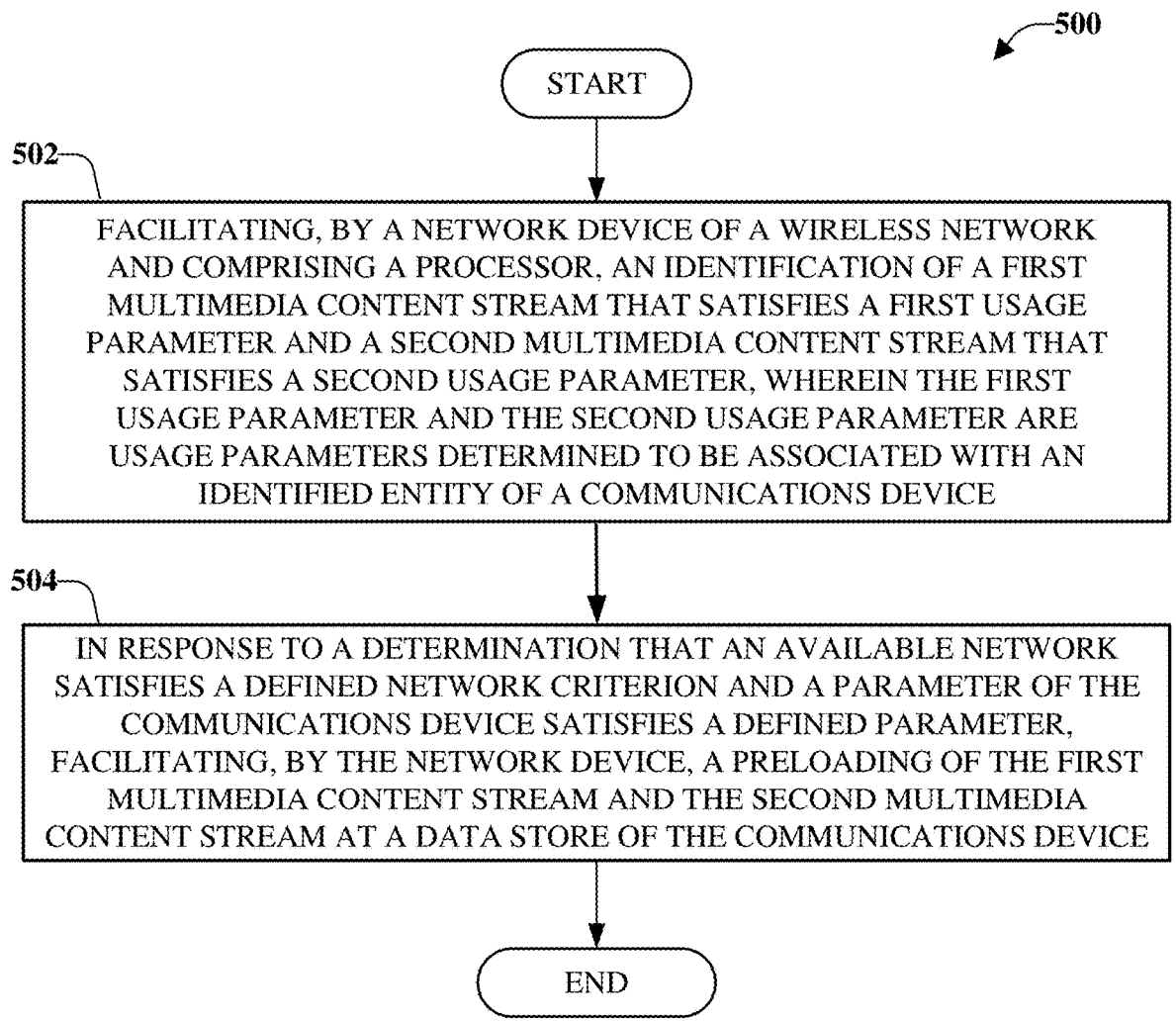
FIG. 5 illustrates an example, non-limiting, method for pre-positioning streaming content onto communication devices in accordance with one or more embodiments described herein.

FIG. 5 illustrates an example, non-limiting, method 500 for pre-positioning streaming content onto communication devices in accordance with one or more embodiments described herein. Repetitive description of like elements employed in other embodiments described herein is omitted for sake of brevity. The method 500 can be implemented by a network device of a wireless network, the network device comprising a processor. Alternatively, or additionally, a machine-readable storage medium can comprise executable instructions that, when executed by a processor, facilitate performance of operations for the method 500.

The method 500 begins at 502 with facilitating an identification of a first multimedia content stream that satisfies a first usage parameter and a second multimedia content stream that satisfies a second usage parameter (e.g., via the recommendation component 118). The first usage parameter and the second usage parameter can be usage parameters determined to be associated with an identified entity of a communication device.

In response to a determination that an available network satisfies a defined network criterion and a parameter of the communication device satisfies a defined parameter, at 504 the method 500 can facilitate a preloading of the first multimedia content stream and the second multimedia content stream at a data store of the communication device (e.g., via the network evaluation component 120 and/or the device parameters component 302).

In an example, the method can include receiving an acceptance of the first multimedia content stream based on a consumption of the first multimedia content stream at the communication device. In response to a second determination that the available network satisfies the defined network criterion and the parameter of the communication device satisfies the defined parameter, the method can facilitate a second preloading of a third multimedia content stream at the data store of the communication device.

According to some implementations, the determination, at 504, can be a first determination, the available network can be a first available network, and the preloading can be a first preloading. Further to these implementations, the method can comprise facilitating removal of the first multimedia content stream and the second multimedia content stream from the data store after a defined time interval. In response to a second determination that a second available network satisfies the defined network criterion and the parameter of the communication device satisfies the defined parameter, the method can facilitate a second preloading of a third multimedia content stream at the data store of the communication device. The third multimedia content stream can satisfy a third usage parameter determined to be associated with the identified entity of the communication device. Further, the third usage parameter can be different than the first usage parameter and the second usage parameter.

Figure 6:
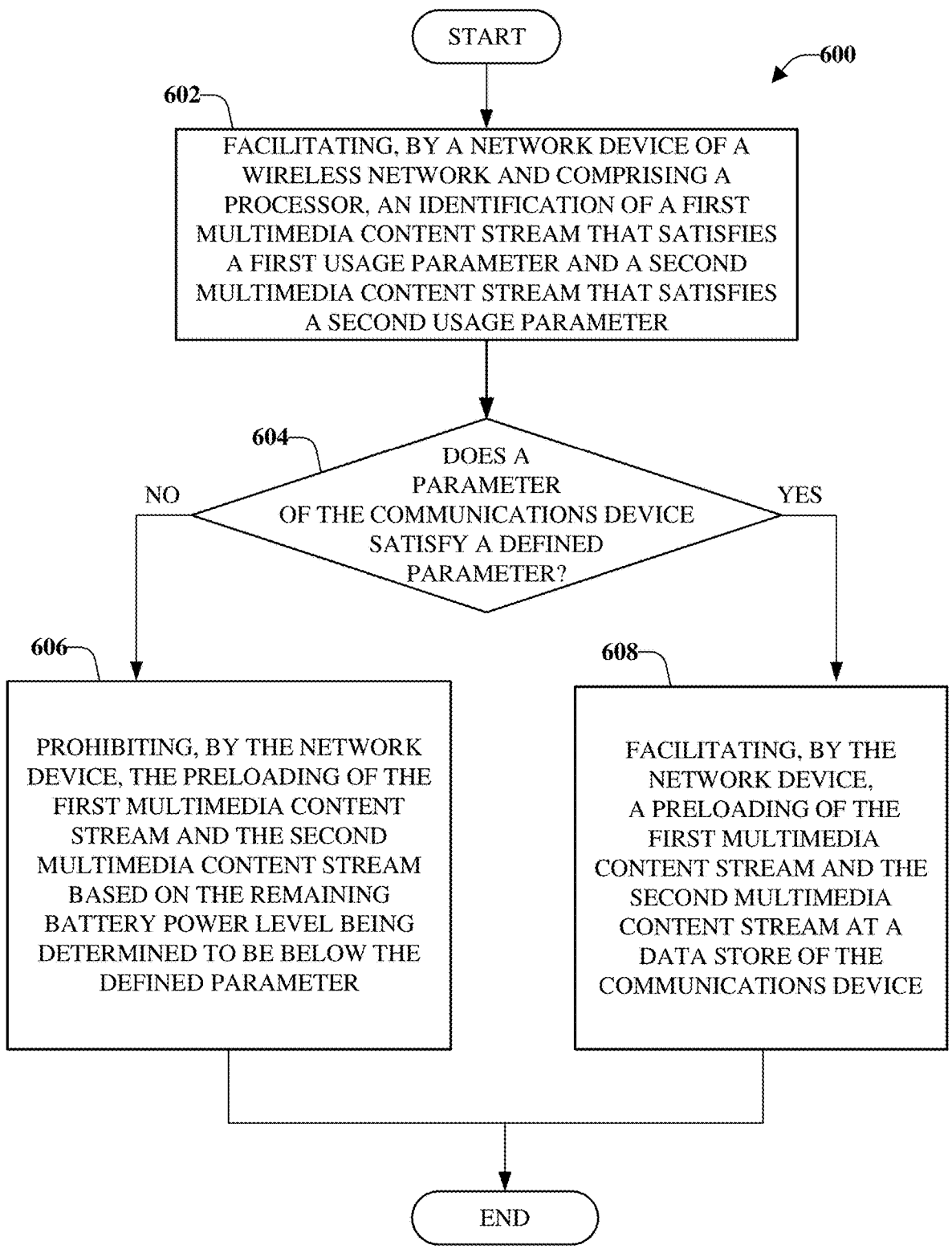
FIG. 6 illustrates an example, non-limiting, method for pre-positioning streaming content based on one or more parameters of communication devices in accordance with one or more embodiments described herein.

FIG. 6 illustrates an example, non-limiting, method 600 for pre-positioning streaming content based on one or more parameters of communication devices in accordance with one or more embodiments described herein. Repetitive description of like elements employed in other embodiments described herein is omitted for sake of brevity. The method 600 can be implemented by a network device of a wireless network, the network device comprising a processor. Alternatively, or additionally, a machine-readable storage medium can comprise executable instructions that, when executed by a processor, facilitate performance of operations for the method 600.

At 602, an identification of a first multimedia content stream that satisfies a first usage parameter and a second multimedia content stream that satisfies a second usage parameter can be facilitated. For example, the one or more multimedia content streams can be associated with related content (e.g., different episodes of a program), different content, or combinations thereof. Further, the usage parameters can relate to multimedia content that a viewing entity (e.g., a defined or identified entity associated with the communication device) has indicated is preferred, historical viewing habits, recently received feedback, and so on.

At 604, a determination can be made whether a parameter of the communication device satisfies a defined parameter. For example, the defined parameter can be that a remaining battery power level of the communication device should be at or above a certain level (e.g., 70%, 35%, and so on). In another example, the defined parameter can be that a remaining storage level of a data store of the communication device should be above a threshold level, which can be expressed in various manners including, for example, an amount of data capacity used or remaining available.

If the determination is the parameter of the communication device does not satisfy the defined parameter ("NO"), the method 600 continues at 606 and the preloading of the first multimedia content stream and the second multimedia content stream at the communication device is prohibited. For example, if the remaining battery power level of the communication device is below the defined battery power level, the preloading can be prohibited. In another example, if the remaining storage level of the data store of the communication device is below a defined storage level, the preloading can be prohibited.

However, if the determination is that the parameter of the communication device does satisfy the defined parameter ("YES"), the method 600 continues at 608 and a preloading of the first multimedia content stream and the second multimedia content stream at a data store of the communication device can be facilitated.

It is to be understood that the determination of whether the parameter satisfies the defined parameter, at 604, can be recursive. For example, the parameters can be reviewed for conformance continuously, periodically, at defined intervals, at variable intervals, or based on one or more parameters (e.g., new content is to be downloaded to the device, a location of the device has changed, and so forth).

Figure 7:
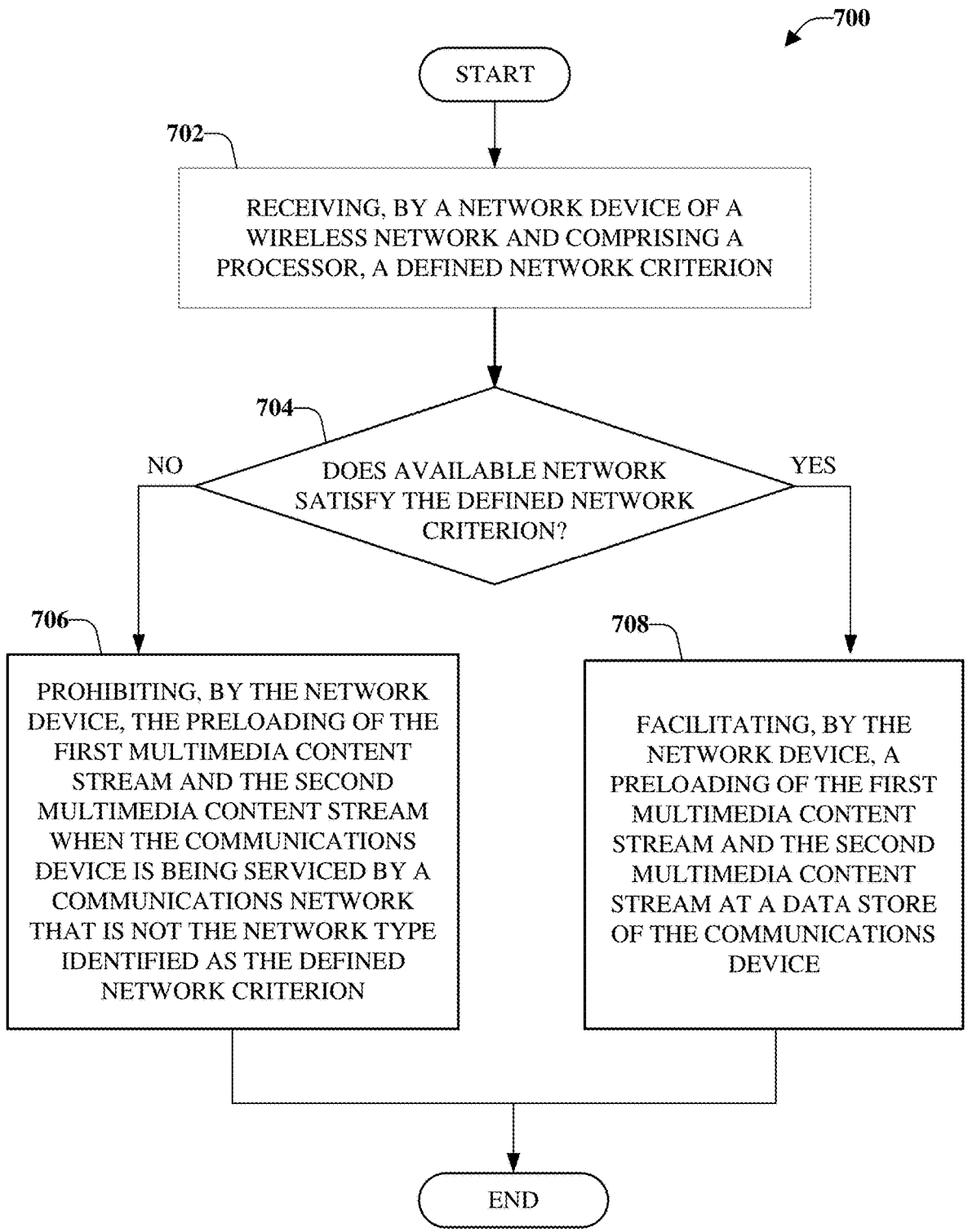
FIG. 7 illustrates an example, non-limiting, method for pre-positioning streaming content based on an available network being a defined network in accordance with one or more embodiments described herein.

FIG. 7 illustrates an example, non-limiting, method 700 for pre-positioning streaming content based on an available network being a defined network in accordance with one or more embodiments described herein. Repetitive description of like elements employed in other embodiments described herein is omitted for sake of brevity. The method 700 can be implemented by a network device of a wireless network, the network device comprising a processor. Alternatively, or additionally, a machine-readable storage medium can comprise executable instructions that, when executed by a processor, facilitate performance of operations for the method 700.

At 702, a notification of a defined network criterion can be received. The one or more network types can be networks identified by a viewing entity as networks for which usage is not a concern. In an example, the defined network criterion can comprise an identified network that does not specify a bandwidth usage limitation.

A determination can be made, at 704, whether an available network satisfies the defined network criterion. For example, the available network can be the network that is servicing the communication device. In another example, the defined network criterion can be an identified network that does not specify a bandwidth usage limitation.

If the determination is that the available network does not satisfy the defined network criterion ("NO"), at 706, the preloading of the first multimedia content stream and the second multimedia content stream can be prohibited. For example, when the communication device is being serviced by a communications network that is not the network type identified as the defined network criterion, the preloading can be disabled. Periodically, or based on other time parameters, another determination can be made whether an available network satisfies the defined network criterion. For example, as the communication device is moved, the communication device can come within range of a network that satisfies the defined network criterion.

If the determination is that the available network does satisfy the defined network criterion ("YES"), at 708, the preloading of the first multimedia content stream and the second multimedia content stream can be enabled. Therefore, preloading of the first multimedia content stream and the second multimedia content stream at a data store of the communication device can be facilitated.

It is to be understood that the determination of whether the parameter satisfies the defined parameter, at 704, can be recursive. For example, the parameters can be reviewed for conformance continuously, periodically, at defined intervals, at variable intervals, or based on one or more parameters (e.g., new content is to be downloaded to the device, a location of the device has changed, and so forth).

Figure 8:
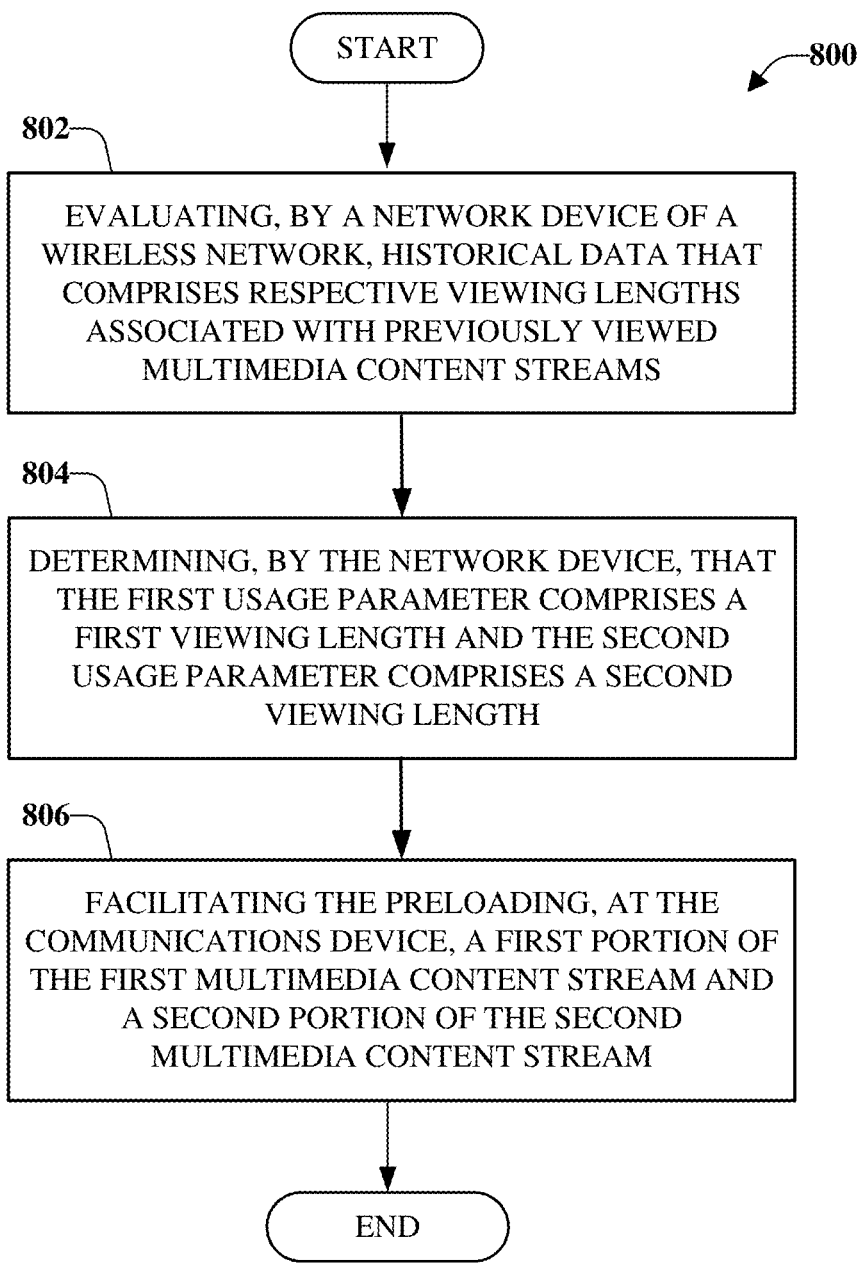
FIG. 8 illustrates an example, non-limiting, method for pre-positioning streaming content comprising different viewing lengths based on preferences of a viewing entity in accordance with one or more embodiments described herein.

FIG. 8 illustrates an example, non-limiting, method 800 for pre-positioning streaming content comprising different viewing lengths based on preferences of a viewing entity in accordance with one or more embodiments described herein. Repetitive description of like elements employed in other embodiments described herein is omitted for sake of brevity. The method 800 can be implemented by a network device of a wireless network, the network device comprising a processor. Alternatively, or additionally, a machine-readable storage medium can comprise executable instructions that, when executed by a processor, facilitate performance of operations for the method 800.

At 802, historical data that comprises respective viewing lengths associated with previously viewed multimedia content streams is evaluated. For example, a viewing entity associated with a communication device can view various content for a defined amount of time (e.g., seven minutes) and, thereafter, can change to a different content (e.g., similar to changing channels on a television). Further, the viewing length of different categories of content can be different. For example, a viewing length for content related to ice skating can be longer than a viewing length of content related to documentaries.

Based on the evaluation, at 804, a determination can be made that the first usage parameter comprises a first viewing length and the second usage parameter comprises a second viewing length. Continuing the above example, the viewing length can be associated with the respective categories of content.

At 806 the method can facilitate the preloading, at the communication device, of a first portion of the first multimedia content stream and a second portion of the second multimedia content stream. The first portion can comprise the first viewing length and the second portion can comprise the second viewing length. The first viewing length and the second viewing length can comprise respective time intervals that are longer, by a defined interval, than a third viewing length associated with the previously viewed multimedia content streams. Continuing the above example, if the ice skating content was viewed for an average of nineteen minutes, the first viewing length can be twenty-two minutes.

Described herein are systems, methods, articles of manufacture, and other embodiments or implementations that can facilitate shared DMRS design in a 5G network. Facilitating shared DMRS design in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as Orthogonal Frequency Division Multiplexing (OFDM), each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
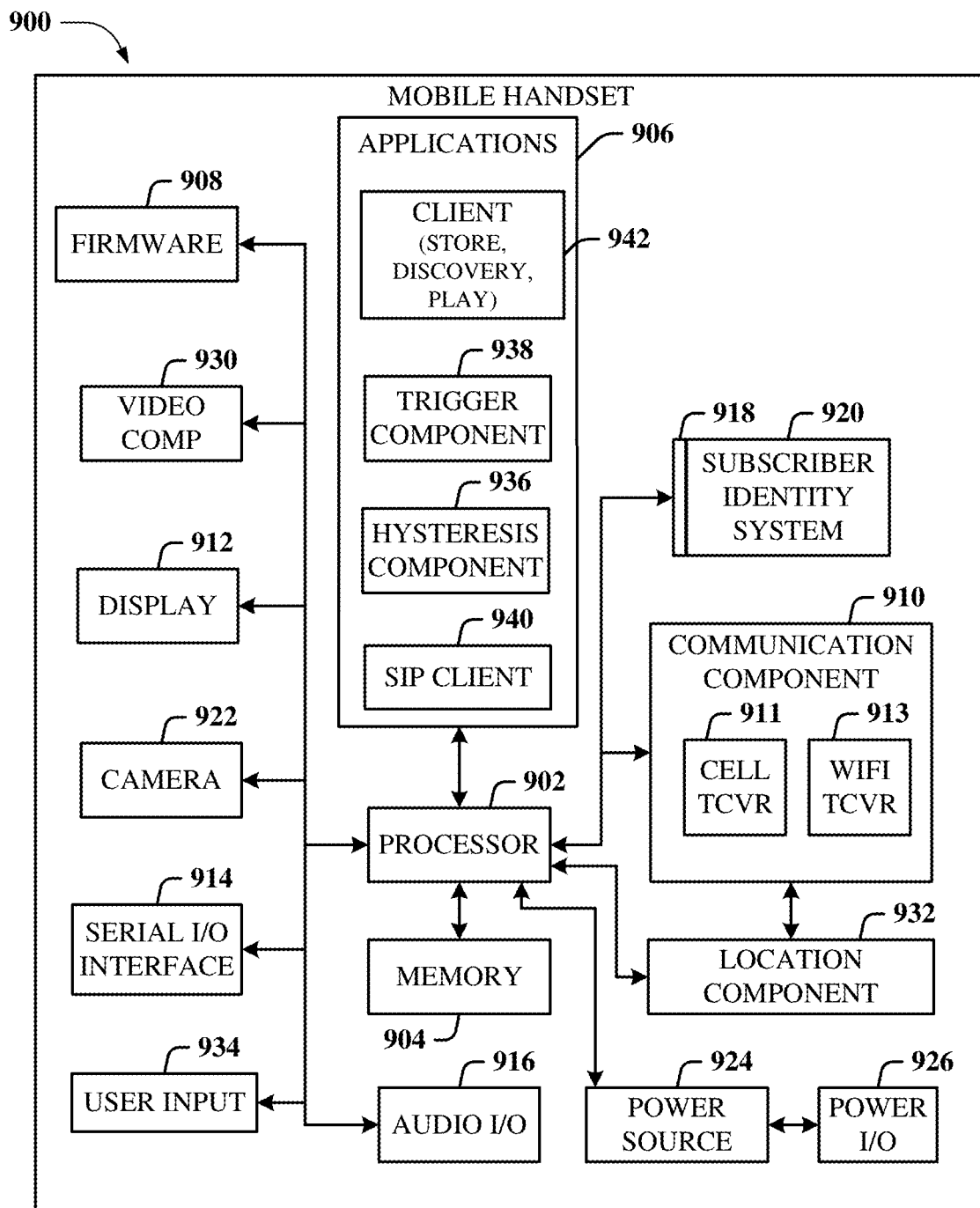
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
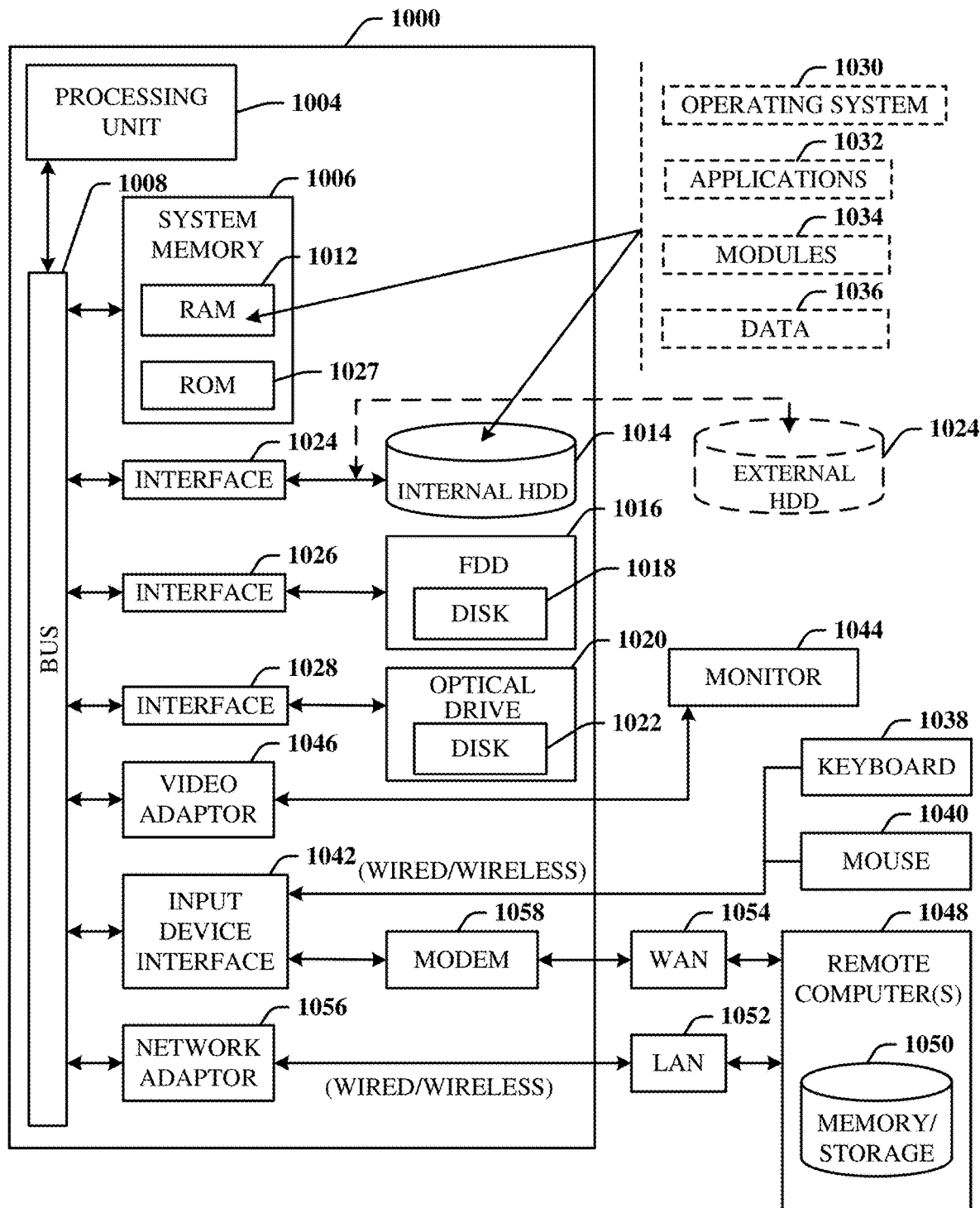
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, rest-room), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
      facilitating an identification of a first multimedia content stream and a second multimedia content stream, wherein the identification of the first multimedia content stream is based on a first usage preference that comprises a first viewing length, and the second multimedia content stream is based on a second usage preference that comprises a second viewing length, and wherein the first usage preference and the second usage preference are associated with a defined entity associated with a communication device; and
      in response to a determination that an available network satisfies a defined network criterion, facilitating pre-positioning, at a data store of the communication device, the first multimedia content stream and the second multimedia content stream, wherein the first viewing length and the second viewing length comprise respective time intervals that are longer, by a defined interval, than a third viewing length associated with previously viewed multimedia content streams.

2. The system of claim 1, wherein the defined network criterion is a network type, and wherein the operations further comprise:
   prior to allowing the facilitating the pre-positioning, receiving a selection of the network type as the defined network criterion; and
   prohibiting the pre-positioning of the first multimedia content stream and the second multimedia content stream in response to the communication device being determined to be in communication with a communications network that is not the network type identified as the defined network criterion.

3. The system of claim 2, wherein the network type is a type assigned to a Wi-Fi network.

4. The system of claim 1, wherein the determination is a first determination, and wherein the operations further comprise:
   in response to a second determination that a power supply capacity of the communication device is below a defined power supply capacity, prohibiting the pre-positioning of the first multimedia content stream and the second multimedia content stream on the communication device.

5. The system of claim 1, wherein the determination is a first determination, and wherein the operations further comprise:
   in response to a second determination that a storage capacity of the data store is below a defined storage capacity, prohibiting the pre-positioning of the first multimedia content stream and the second multimedia content stream on the communication device.

6. The system of claim 1, wherein the facilitating the pre-positioning further comprise:
   facilitating the pre-positioning, at the communication device, of a first portion of the first multimedia content stream and a second portion of the second multimedia content stream, wherein the first portion and the second portion comprise respective viewing lengths that comprise respective time intervals that are longer than the third viewing length associated with the previously viewed multimedia content streams by a defined length.

7. The system of claim 1, wherein the operations further comprise:
removing, the first multimedia content stream from the data store based on an indication received from the communication device that the first multimedia content stream is not of interest to the defined entity, and wherein removal of the first multimedia content stream from the data store discontinues recommendations of multimedia content streams associated with the first usage preference utilized to recommend the first multimedia content stream.

8. The system of claim 1, wherein the determination that the available network satisfies the defined network criterion is a first determination, and the operations further comprise:
in response to a second determination that the first multimedia content stream and the second multimedia content stream were not consumed during a defined time interval, removing the first multimedia content stream and the second multimedia content stream from the data store; and
in response to a third determination that a third multimedia content stream satisfies a third usage preference and the available network continues to satisfy the defined network criterion, facilitating the pre-positioning, at the data store of the communication device, the third multimedia content stream.

9. A method, comprising:
facilitating, by a network device of a wireless network and comprising a processor, an identification of a first multimedia content stream that satisfies a first usage parameter and a second multimedia content stream that satisfies a second usage parameter, wherein the first usage parameter and the second usage parameter are usage parameters determined to be associated with an identified entity of a communication device, and wherein the first usage parameter comprises a first viewing length and the second usage parameter comprises a second viewing length associated with previously viewed multimedia content streams; and
in response to a determination that an available network satisfies a defined network criterion and a parameter of the communication device satisfies a defined parameter, facilitating, by the network device, a preloading of a first portion of the first multimedia content stream and a second portion of the second multimedia content stream at a data store of the communication device, wherein the first viewing length and the second viewing length comprise respective time intervals that are longer, by a defined interval, than a third viewing length associated with the previously viewed multimedia content streams.

10. The method of claim 9, wherein the defined parameter comprises a remaining battery power level of the communication device, and wherein the method further comprises:
prohibiting, by the network device, the preloading of the first multimedia content stream and the second multimedia content stream based on the remaining battery power level being determined to be below the defined parameter.

11. The method of claim 9, wherein the defined parameter comprises a remaining storage level of the data store, and wherein the method further comprises:
prohibiting, by the network device, the preloading of the first multimedia content stream and the second multimedia content stream based on the remaining storage level of the data store being determined to be below the defined parameter.

12. The method of claim 9, wherein the defined network criterion comprises an identified network that does not specify a bandwidth usage limitation.

13. The method of claim 9, further comprising:
prior to facilitating pre-positioning, receiving, by the network device, a notification of a network type as the defined network criterion; and
prohibiting, by the network device, the preloading of the first multimedia content stream and the second multimedia content stream when the communication device is being serviced by a communications network that is not the network type identified as the defined network criterion.

14. The method of claim 9, wherein the determination is a first determination, wherein the preloading is a first preloading, and wherein the method further comprises:
receiving, by the network device, an acceptance of the first multimedia content stream based on a consumption of the first multimedia content stream at the communication device; and
in response to a second determination that the available network satisfies the defined network criterion and the parameter of the communication device satisfies the defined parameter, facilitating, by the network device, a second preloading of a third multimedia content stream at the data store of the communication device.

15. The method of claim 9, wherein the determination is a first determination, wherein the available network is a first available network, wherein the preloading is a first preloading, and wherein the method further comprises:
facilitating, by the network device, removal of the first multimedia content stream and the second multimedia content stream from the data store after a defined time interval; and
in response to a second determination that a second available network satisfies the defined network criterion and the parameter of the communication device satisfies the defined parameter, facilitating, by the network device, a second preloading of a third multimedia content stream at the data store of the communication device, wherein the third multimedia content stream satisfies a third usage parameter determined to be associated with the identified entity of the communication device, and wherein the third usage parameter is different than the first usage parameter and the second usage parameter.

16. A machine-readable storage medium, comprising executable instructions that, when executed by a processor, facilitate performance of operations, comprising:
evaluating usage preferences of a defined entity of a communication device, wherein the usage preferences comprise historical viewing habits of the defined entity, the usage preferences comprise a first viewing length and a second viewing length associated with previously viewed multimedia content streams;
based on a first determination that a first multimedia content stream conforms to the usage preferences of the defined entity, a second determination that a network parameter satisfies a defined network parameter, and a third determination that a device capability satisfies a defined device capability, facilitating a first preloading of a first portion of the first multimedia content stream to a data store of the communication device; and based on an indication received from the communication device that the first multimedia content stream has been consumed at the communication device, and a fourth determination that the network parameter continues to satisfy the defined network parameter, facilitating a second preloading of a second portion of a second multimedia content stream to the data store of the communication device, wherein the second multimedia content stream is related to the first multimedia content stream, and wherein the first viewing length and the second viewing length comprise respective time intervals that are longer, by a defined interval, than a third viewing length associated with the previously viewed multimedia content streams.

17. The machine-readable storage medium of claim 16, wherein the defined device capability is an available storage capacity of the data store being above a defined storage capacity.

18. The machine-readable storage medium of claim 16, wherein the defined device capability is an available battery power capacity of the data store being above a defined battery power capacity.

19. The machine-readable storage medium of claim 16, wherein the operations further comprise:

facilitating measurements of respective viewing lengths associated with previously viewed multimedia content streams; and facilitating pre-positioning, at the communication device, the first portion of the first multimedia content stream and the second portion of the second multimedia content stream, wherein the first portion comprises the first viewing length and the second portion comprises the second viewing length, and wherein the first viewing length and the second viewing length comprise respective time intervals that are longer than the respective viewing lengths associated with the previously viewed multimedia content streams by the defined interval.

20. The machine-readable storage medium of claim 16, wherein the operations further comprise:

determining a remaining battery power level of the communication device is below a defined power level; and prohibiting the first preloading of the first portion of the first multimedia content stream and the second preloading of the second portion of the second multimedia content stream based on the remaining battery power level being determined to be below the defined power level.

* * * * *